(12) United States Patent
Long et al.

(10) Patent No.: US 10,297,015 B2
(45) Date of Patent: May 21, 2019

(54) METHOD, DEVICE AND COMPUTER-READABLE MEDIUM FOR IDENTIFYING FEATURE OF IMAGE

(71) Applicant: Xiaomi Inc., Beijing (CN)

(72) Inventors: Fei Long, Beijing (CN); Zhijun Chen, Beijing (CN); Tao Zhang, Beijing (CN)

(73) Assignee: Xiaomi Inc., Beijing (CN)

( * ) Notice: Subject to any disclaimer, the term of this patent is extended or adjusted under 35 U.S.C. 154(b) by 275 days.

(21) Appl. No.: 15/359,816

(22) Filed: Nov. 23, 2016

(65) Prior Publication Data

US 2017/0148147 A1 May 25, 2017

(30) Foreign Application Priority Data

Nov. 25, 2015 (CN) .......................... 2015 1 0827886

(51) Int. Cl.
| | |
|---|---|
| G06K 9/46 | (2006.01) |
| G06T 5/40 | (2006.01) |
| G06K 9/52 | (2006.01) |
| G06K 9/62 | (2006.01) |
| G06T 5/00 | (2006.01) |
| G06T 5/10 | (2006.01) |
| G06T 7/11 | (2017.01) |

(52) U.S. Cl.
CPC .............. *G06T 5/40* (2013.01); *G06K 9/4642* (2013.01); *G06K 9/522* (2013.01); *G06K 9/6298* (2013.01); *G06T 5/001* (2013.01); *G06T 5/10* (2013.01); *G06T 7/11* (2017.01); *G06T 2207/20021* (2013.01); *G06T 2207/20052* (2013.01); *G06T 2207/20056* (2013.01)

(58) Field of Classification Search
CPC .............. G06K 9/4642; G06K 9/6212; G06K 2009/485; G06K 9/4671; G06T 2207/20021
See application file for complete search history.

(56) References Cited

U.S. PATENT DOCUMENTS

| | | |
|---|---|---|
| 2012/0099790 A1 | 4/2012 | Lyuh et al. |
| 2013/0216097 A1 | 8/2013 | Pau et al. |
| 2014/0169663 A1 | 6/2014 | Han et al. |

(Continued)

FOREIGN PATENT DOCUMENTS

| | | |
|---|---|---|
| CN | 102254185 | 11/2011 |
| CN | 103903238 | 7/2014 |
| CN | 104866865 | 8/2015 |

(Continued)

OTHER PUBLICATIONS

Fusek et al., "Gradient-DCT (G-DCT) Descriptors", Image Processing Theory, Tools and Applications, IEEE, 2014, 6 pages total. (Year: 2014).*

(Continued)

*Primary Examiner* — Brian Werner
(74) *Attorney, Agent, or Firm* — Finnegan, Henderson, Farabow, Garrett & Dunner LLP

(57) ABSTRACT

A method for identifying a feature of an image is provided. The method includes: segmenting an image into a plurality of blocks, wherein each block includes a plurality of cells; transforming pixels of each cell from a spatial domain to a frequency domain; and identifying a Histogram of Oriented Gradient (HOG) feature of the image in the frequency domain.

15 Claims, 11 Drawing Sheets

(56) References Cited

U.S. PATENT DOCUMENTS

2014/0219557 A1  8/2014  Liao

FOREIGN PATENT DOCUMENTS

| CN | 105046224 | 11/2015 |
| CN | 105654093 | 6/2016 |
| JP | 07057077 | 3/1995 |
| JP | 10056570 A | 2/1998 |
| JP | 2011521355 | 7/2011 |
| KR | 20140042551 A | 4/2014 |
| KR | 20150079583 A | 7/2015 |
| RU | 2461017 | 9/2012 |

OTHER PUBLICATIONS

Kroputaponchai et al., "Video Authentication using Spatio-Temporal Signature for Surveillance System", 2015 12th International Joint Conference on Computer Science and Software (JCSSE), IEEE, Aug. 27, 2015, cover page and pp. 24-29. (Year: 2015).*

Communication from European Patent Office for European Application No. 16 199 236.7, dated Mar. 21, 2018, 7 pages.

Extended European Search Report from European Search Report for European Application No. 161992367.7, dated Apr. 18, 2017, 9 pages.

Wenlong Fu et al., "Multi-Frequency Transformation for Edge Detection," Image and Vision Computing New Zealand, ACM, USA, Nov. 26, 2012, pp. 204-209, 6 pages.

Alain Rakotomamonjy et al., "Histogram of Gradients of Time-Frequency Representations for Audio Scene Classification," IEEE/ACM Transactions on Audio, Speech, and Language Processing, IEEE, USA, vo. 23, No. 1, Jan. 1, 2015, pp. 142-153, 12 pages.

Henrick Skibbe et al., "Circular Fourier-Hog Features for Rotation Invariant Object Detection in Biomedical Images," Dept. of Diagnostic Radiology, Medical Physics, University Medical Center, Frieburg, German, IEEE, 2012, pp. 450-453, 4 pages.

G.B. Yuzhakov, "An Algorithm for the Rapid Formation of Image Descriptors Based on the Technique of Abstract Histograms of Oriented Gradients," Information Science, Mathematical Modelling, Economics, Studies of the Moscow Institute of Physics and Technology (MIPT), 2013, vol. 5, No. 3, pp. 84-91, 9 pages.

Notice of Grounds for Rejection mailed from the Korean Intellectual Property Office for Korean Application No. 10-2016-7005590, dated Nov. 18, 2016 and English translation thereof, 9 pages.

Official Action of the Substantive Examination from Russian Patent Office for Russian Application No. 2016110721, dated May 24, 2017, 15 pages.

International Search Report of International Application No. PCT/CN2015/099310, from the State Intellectual Property Office of China, dated Aug. 16, 2016. (12 pages).

Notice of Grant from Korean Intellectual Property Office for Korean Application No. 10-2016-7005590, dated Jun. 23, 2017 and English translation thereof (3 pages).

Ayato Toya et al. "Pedestrian Recognition using Stereo Vision and Histogram of Oriented Gradients (HOG)," vol. 2008, No. 25, IPSJ SIG Technical Reports, Information Processing Society of Japan, Mar. 2008, 8 pages.

* cited by examiner

METHOD, DEVICE AND COMPUTER-READABLE MEDIUM FOR IDENTIFYING FEATURE OF IMAGE

CROSS-REFERENCE TO RELATED APPLICATION

This application is based upon and claims priority to Chinese Patent Application No. 201510827886.1, filed Nov. 25, 2015, the entire contents of which are incorporated herein by reference.

TECHNICAL FIELD

The present disclosure generally relates to the field of image processing and, more particularly, to a method, a device, and computer-readable medium for identifying a feature of an image.

BACKGROUND

In the field of image detection and recognition, a widely used technique is to identify certain features of an image so as to detect and identify objects in the image.

Conventionally, objects in an image may be detected and identified by extracting a Histogram of Oriented Gradient (HOG) feature of the image. The method for extracting the HOG feature includes calculating a gradient of each pixel in an image, and segmenting the image into a plurality of cells, where each cell includes a plurality of pixels, and adjacent n cells compose a block. The method further includes counting the histogram of gradient of all the pixels in each cell, obtaining the HOG feature of each block based on the histogram of gradient of all the cells in the block, and counting the HOG features of all the blocks in the image to obtain the HOG feature of the image.

SUMMARY

According to a first aspect of the present disclosure, there is provided a method for identifying a feature of an image, comprising: segmenting an image into a plurality of blocks, wherein each block includes a plurality of cells; transforming pixels of each cell from a spatial domain to a frequency domain; and identifying a Histogram of Oriented Gradient (HOG) feature of the image in the frequency domain.

According to a second aspect of the present disclosure, there is provided a device for identifying a feature of an image, comprising: a processor; and a memory for storing instructions executable by the processor. The processor is configured to: segment an image into a plurality of blocks, wherein each block includes a plurality of cells; transform pixels of each cell from a spatial domain to a frequency domain; and identify a Histogram of Oriented Gradient (HOG) feature of the image in the frequency domain.

According to a third aspect of the present disclosure, there is provided a non-transitory computer-readable storage medium having stored therein instructions that, when executed by a processor, cause the processor to perform a method for identifying a feature of an image, the method comprising: segmenting an image into a plurality of blocks, wherein each block includes a plurality of cells; transforming pixels of each cell from a spatial domain to a frequency domain; and identifying a Histogram of Oriented Gradient (HOG) feature of the image in the frequency domain.

It is to be understood that both the forgoing general description and the following detailed description are exemplary only, and are not restrictive of the present disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which same numbers in different drawings represent same or similar elements unless otherwise described. The implementations set forth in the following description of exemplary embodiments do not represent all implementations consistent with the disclosure. Instead, they are merely examples of devices and methods consistent with aspects related to the disclosure as recited in the appended claims.

Figure 1:
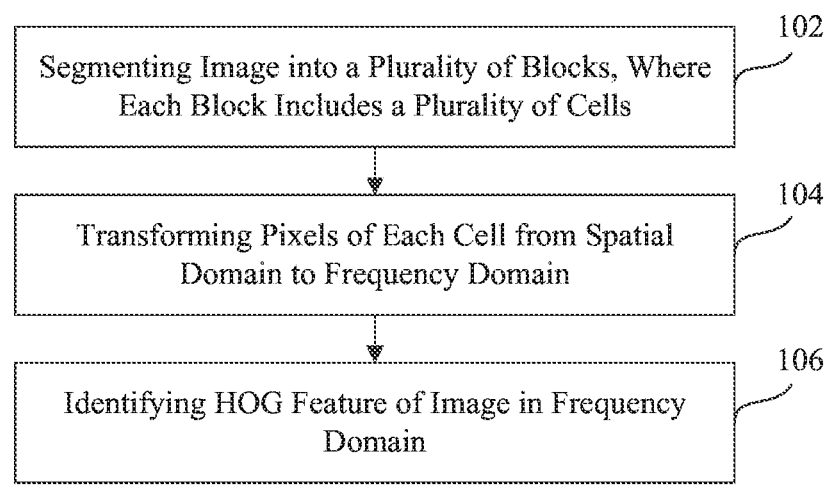
FIG. 1 is a flowchart of a method for identifying a feature of an image, according to an exemplary embodiment.

FIG. 1 is a flowchart of a method 100 for identifying a feature of an image, according to an exemplary embodiment. The method 100 may be performed by a device, such as a terminal device. Referring to FIG. 1, the method 100 includes the following steps.

In step 102, the device segments an image into a plurality of blocks, where each block includes a plurality of cells.

In step 104, the device transforms pixels of each cell from a spatial domain to a frequency domain.

In step 106, the device identifies a Histogram of Oriented Gradient (HOG) feature of the image in the frequency domain.

In the method 100, by transforming pixels of each cell from a spatial domain to a frequency domain and identifying the HOG feature of the image in the frequency domain, the detection ratio and accuracy in image recognition can be improved.

Figure 2A:
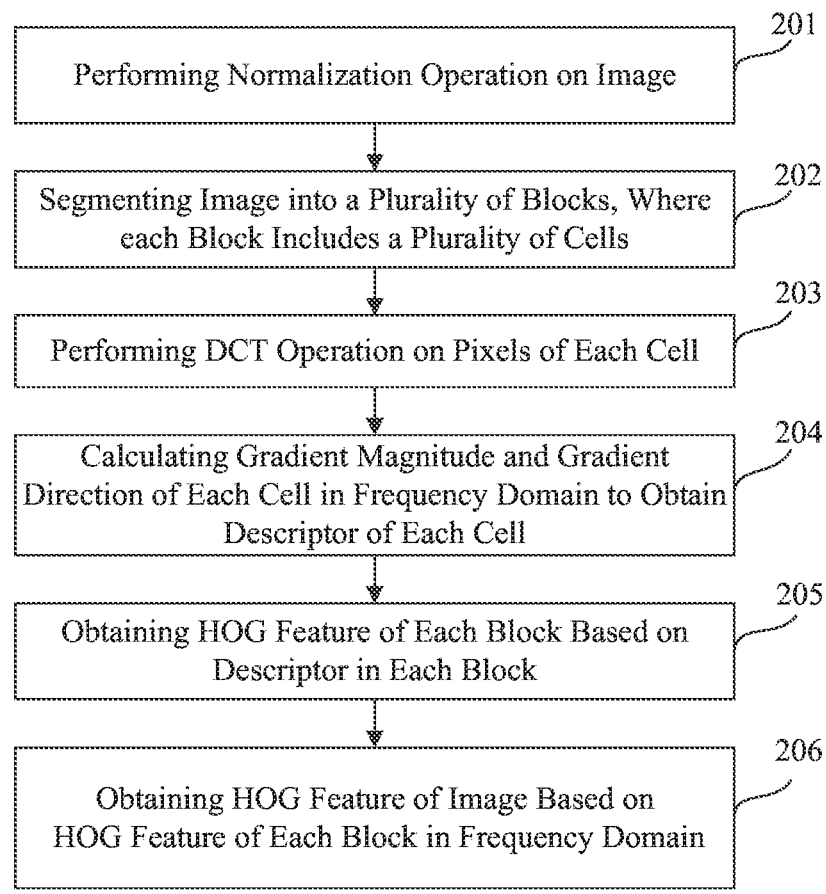
FIG. 2A is a flowchart of a method for identifying a feature of an image, according to another exemplary embodiment.

FIG. 2A is a flowchart of a method 200a for identifying a feature of an image, according to another exemplary embodiment. The method 200a may be performed by a device, such as a terminal device. Referring to FIG. 2A, the method 200a includes the following steps.

In step 201, the device performs a normalization operation on the image to obtain an image having a predefined magnitude.

In some implementations, features of a plurality of images may be identified to detect an object in the images. Before identifying features from the images, the device normalizes the images so that the images having different magnitudes are transformed to images having a predefined magnitude.

In step 202, the device segments the image into a plurality of blocks, where each block includes a plurality of cells.

Figure 2B:
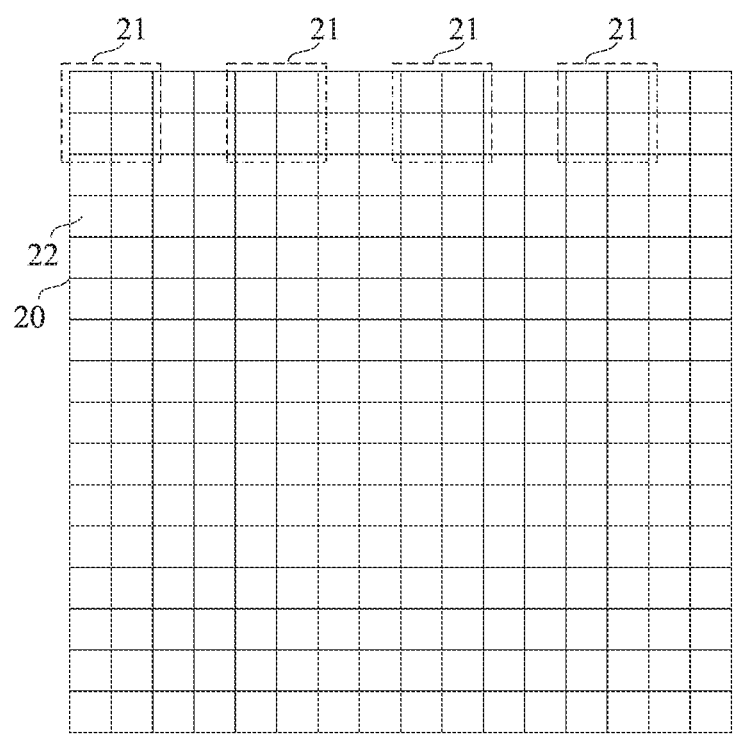
FIG. 2B is a schematic diagram illustrating an image segmentation method, according to an exemplary embodiment.

In some embodiments, the device segments the image into a plurality of cells, and then composes a block by joining the neighboring cells. FIG. 2B is a schematic diagram 200b illustrating an image segmentation method, according to an exemplary embodiment. As shown in FIG. 2B, an image 20 is segmented into a plurality of blocks 21, where each block 21 consists of four contiguous cells 22.

In segmenting the image, the order of segmenting the image into blocks and segmenting the image into cells is not limited by the present disclosure. The image may be firstly segmented into blocks and then the blocks are segmented into cells, or the image may be firstly segmented into cells and then the cells are concatenated to compose respective blocks.

The present disclosure does not limit whether there is an overlap between the segmented blocks of the image. There may be an overlap between the blocks or there may not be an overlap between the blocks.

Referring to FIG. 2B, the image 20 has dimensions of 128×128 pixels. The image 20 is segmented into blocks 21, each of which has dimensions of 16×16 pixels, where the blocks 21 do not overlap with each other. Each of blocks 21 is further segmented into cells 22, each of which has dimensions of 8×8 pixels. As shown in FIG. 2B, the image 20 includes 8×8=64 non-overlapping blocks 21, and each block 21 includes 2×2=4 cells 22.

Figure 2C:
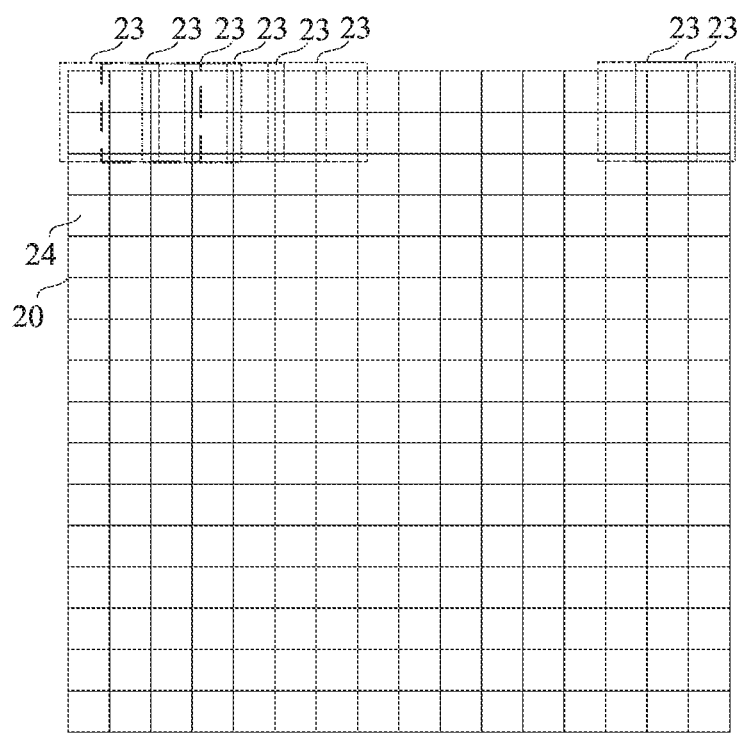
FIG. 2C is a schematic diagram illustrating an image segmentation method, according to another exemplary embodiment.

FIG. 2C is a schematic diagram 200c illustrating another image segmentation method, according to another exemplary embodiment. Referring to FIG. 2C, the image 20 is segmented into blocks 23 having dimensions of 16×16 pixels, where the blocks 23 are overlapping. Each of blocks 23 is further segmented into cells 24 having dimensions of 8×8 pixels. As shown in FIG. 2C, the image 20 includes 16×16=256 overlapping blocks 23, and each block 23 includes 2×2=4 cells 24.

In step 203, the device performs a Discrete Cosine Transform (DCT) operation on pixels of each cell.

In one example, assuming pixels of each cell form a matrix A with dimensions of M×N pixels, the DCT coefficient of the matrix A may be calculated as follows:

$$B_{p \cdot q} = \alpha_p \alpha_q \sum_{m=0}^{M-1} \sum_{n=0}^{N-1} A_{mn} \cos\frac{\pi(2m+1)p}{2M} \cos\frac{\pi(2n+1)q}{2N}$$

where $$\alpha_p = \begin{cases} 1/\sqrt{M}, & p=0 \\ \sqrt{2/M}, & 1 \le p \le M-1 \end{cases}, \alpha_q = \begin{cases} 1/\sqrt{N}, & q=0 \\ \sqrt{2/N}, & 1 \le q \le N-1 \end{cases},$$

$B_{p \cdot q}$ is the DCT coefficient of the matrix A, p=0,1,2 . . . , M−1, m=0,1,2 . . . ,M−1, q=0,1,2 . . . ,N−1, n=0,1,2 . . . ,N−1.

The DCT is performed on each cell of the image and, as a result, the image is transformed from the spatial domain to the frequency domain.

In other embodiments, the device may perform a Discrete Fourier transform (DFT) operation on pixels of each cell.

In one example, if each cell has dimensions of M×N pixels, the function of pixels (x, y) is f(x, y), the DFT coefficient F(u, v) of the function f(x, y) may be calculated as followings:

$$F(u, v) = \frac{1}{MN} \sum_{x=0}^{M-1} \sum_{y=0}^{N-1} f(x, y) e^{-j2\pi(ux/M + vy/N)}$$

where u=0,1,2 . . . ,M−1, v=0,1,2 . . . ,N−1.

The device may perform the DFT operation on each cell of the image and, as a result, the image is transformed from the spatial domain to the frequency domain.

Referring again to FIG. 2A, in step 204, the device calculates a gradient magnitude and a gradient direction of each cell in the frequency domain to obtain a descriptor of each cell.

For example, the device may calculate a transverse gradient and a longitudinal gradient of each pixel in each cell, on which the DCT or DFT is performed, by using a gradient operator. Example gradient operators are listed in Table 1.

TABLE 1

| Mask type | Central vector | Non-central vector | Correction vector | diagonal | Sobel operator |
|---|---|---|---|---|---|
| operator | [1 0 −1] | [1 −1] | [1 −8 0 −8 1] | $\begin{pmatrix} 0 & 1 \\ -1 & 0 \end{pmatrix} \begin{pmatrix} 1 & 0 \\ 0 & -1 \end{pmatrix}$ | $\begin{pmatrix} 1 & 0 & -1 \\ 2 & 0 & -2 \\ 1 & 0 & 1 \end{pmatrix}$ |

In some embodiments, when calculating the gradient magnitude of the pixels in each cell, a gradient operator in Table 1 may be selected, or another gradient operator may be selected. The selection of gradient operator is not limited by the present disclosure.

In one example, if the transverse gradient of the pixel (x, y) is H(x, y), and the longitudinal gradient of the pixel (x, y) is V(x, y), the gradient direction and the gradient magnitude of each pixel may be calculated by formula (1) and (2) as follows:

$$\theta(x,y) = \tan^{-1}[V(x,y)/H(x,y)] \text{tm} \quad (1)$$

$$m(x,y) = [H(x,y)^2 + V(x,y)^2]^{1/2} \quad (2)$$

where θ(x,y) is the gradient direction of the pixel (x, y), and m(x, y) is the gradient magnitude of the pixel (x, y).

The gradient direction θ(x,y) belongs to a range of −90 degrees to 90 degrees. The gradient direction θ(x,y) may be divided evenly into z portions, and for each cell, the pixels in respective divided portions may be weighted based on the gradient magnitude m(x, y) to obtain a z-dimensional vector as the descriptor of the cell.

In one example, the gradient direction θ(x,y) is divided evenly into 9 portions, and the angle corresponding to each portion is 20 degrees. For each cell, pixels in each portion of the cell is weighted based on the gradient magnitude m(x, y) to obtain a 9-dimensional vector. The number of portions the gradient direction is divided into is not limited by the present disclosure.

In step 205, the device obtains a HOG feature of each block based on the descriptor in each block.

For example, the device may cascade the descriptors corresponding to respective cells in each block to obtain a vector as the HOG feature of the block, where each block consists of k cells, and the dimension of the vector is k times of the dimension of the descriptor corresponding to the cells contained in the block.

In one example, the descriptor in each cell is a 9-dimensional vector, and each block includes 4 cells. The 9-dimensional descriptors in 4 cells are cascaded to form a 36-dimensional vector as the HOG feature of the corresponding block.

In step 206, the device obtains the HOG feature of the image based on the HOG feature of each block in the frequency domain.

In some embodiments, the HOG features of respective blocks in the image are cascaded to form a matrix as the HOG feature of the image, where each column of the matrix represents the HOG feature of one of the blocks.

Figure 2D:
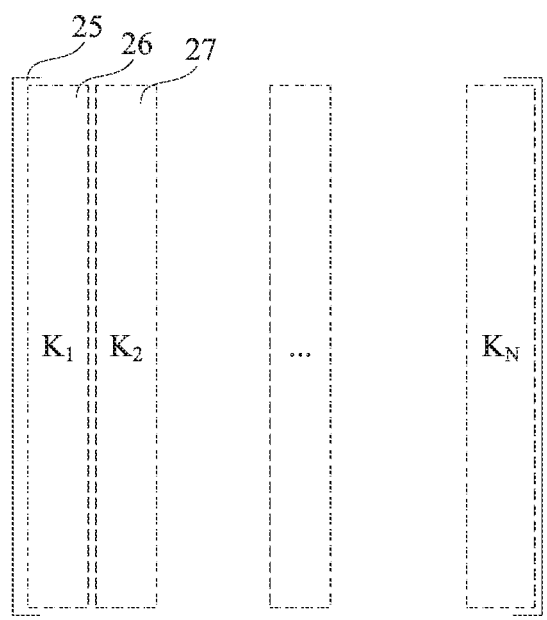
FIG. 2D is a schematic diagram illustrating a HOG feature of an image, according to an exemplary embodiment.

FIG. 2D is a schematic diagram 200d illustrating a HOG feature of an image, according to an exemplary embodiment. As shown in FIG. 2D, the image includes K blocks, the HOG feature of each block is denoted as $K_i$, and $K_i$ are cascaded to form a matrix 25, where $K_1$ 26 is placed at the first column of the cascaded matrix 25, $K_2$ 27 is placed at the second column of the cascaded matrix 25, and so on.

In the method 200a, by segmenting an image into a plurality of blocks, each block including a plurality of cells, performing a DCT or DFT operation on each cell, and identifying the HOG features in the frequency domain, the detection ratio and accuracy in image recognition can be improved.

Figure 3A:
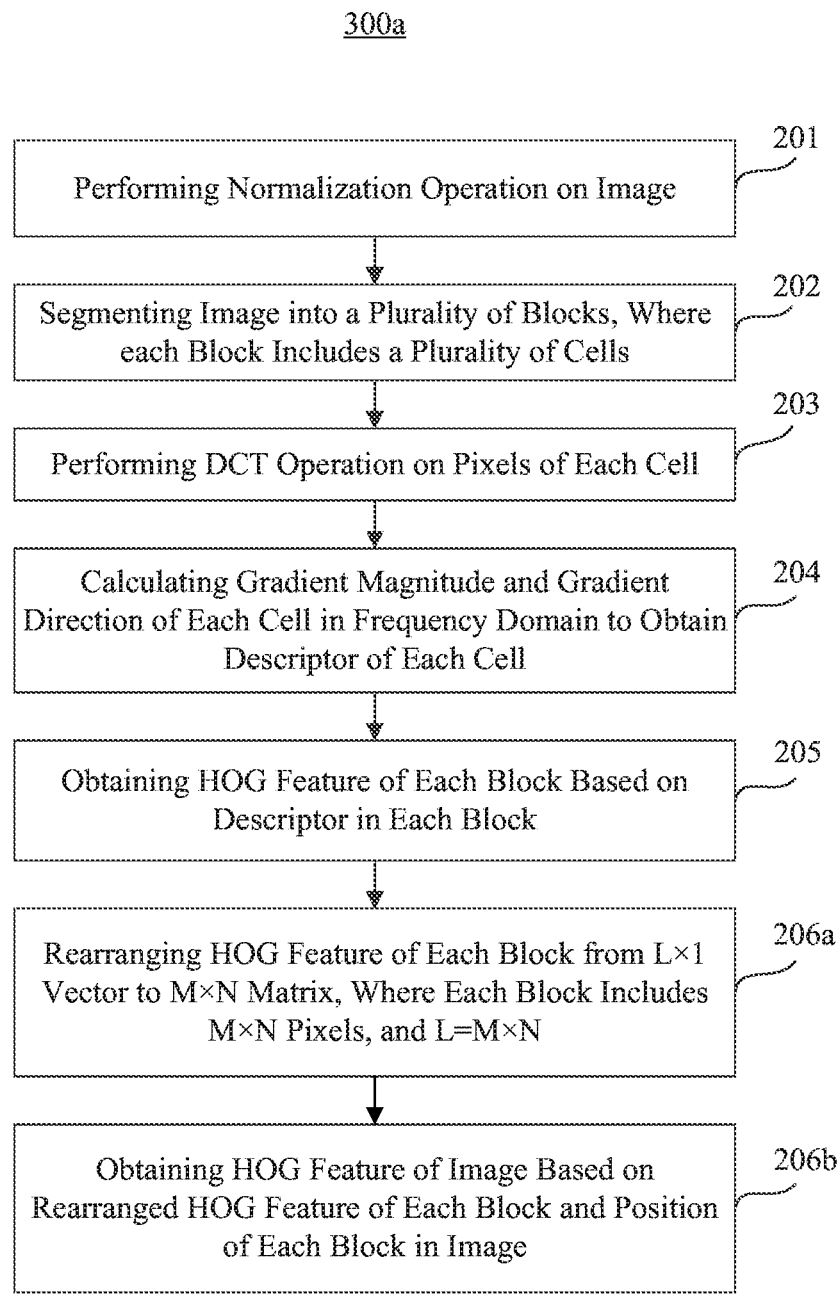
FIG. 3A is a flowchart of a method for identifying a feature of an image, according to an exemplary embodiment.

FIG. 3A is a flowchart of another method 300a for identifying a feature of an image, according to an exemplary embodiment. The method 300a can be performed by a device, such as a terminal device. In the method 300a, the HOG feature of each of block in the image are rearranged based on the corresponding positions in the image to obtain the HOG feature of the image. Referring to FIG. 3A, the method 300a includes steps 206a and 206b, in addition to steps 201-205 described above in connection with FIG. 2A.

In step 206a, the device rearranges the HOG feature of each block in the image from an initial L×1 vector to an M×N matrix, where each block includes M×N pixels, and L=M×N.

As discussed above, the HOG feature of each block is an L×1 vector obtained by cascading the descriptors corresponding to each cells. The L×1 vector is rearranged into an M×N matrix based on the included cells, where each column of the matrix represents the descriptor of one cell. The descriptor of each of cells are adjusted based on the corresponding pixels such that each column of the matrix represents the HOG feature corresponding to the pixels of the corresponding column in the block.

In step 206b, the device obtains the HOG feature of the image based on the rearranged HOG feature of each block and the position of each block in the image.

Figure 3B:
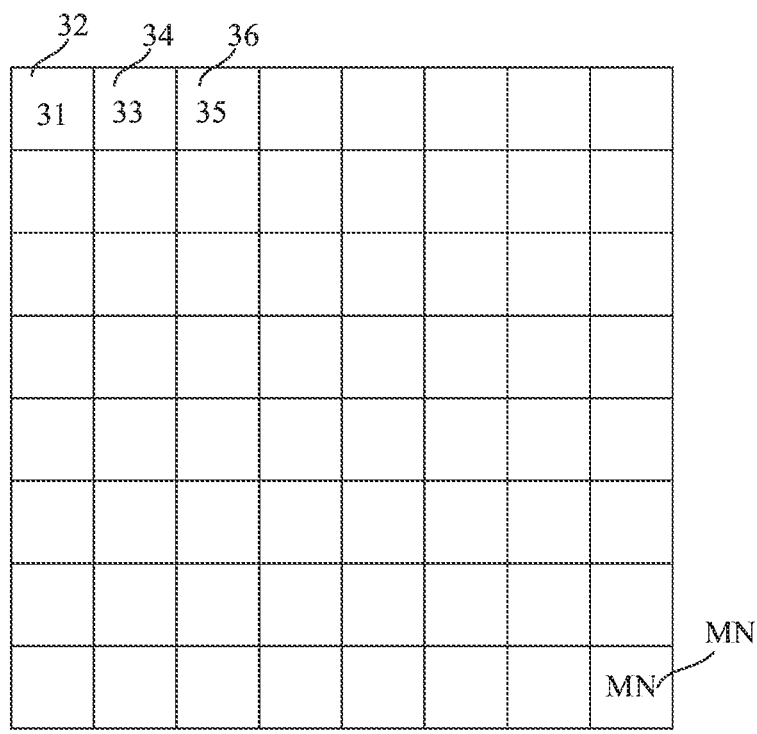
FIG. 3B is schematic diagram illustrating another HOG feature of an image, according to an exemplary embodiment.

FIG. 3B is schematic diagram 300b illustrating another HOG feature of an image, according to an exemplary embodiment. Referring to FIG. 3B, the image includes K blocks, the HOG feature of each block is denoted as Ki, and the HOG features $K_i$ are rearranged to form an M*N matrix. As shown in FIG. 3B, the rearranged matrix 31 of $K_1$ is placed at the position in the image corresponding to the position of the first block 32, the rearranged matrix 33 of $K_2$ is placed at the position in the image corresponding to the position of the second block 34, and so on, with the last matrix MN being placed at the position in the image corresponding to the position of the last block MN.

In the method 300a, by rearranging the HOG features of respective blocks in the image from an initial L×1 vector to an M*N matrix, and obtaining the HOG feature of the image based on the position of each block in the image, the feature of each block in the image can be made more prominent.

Figure 4:
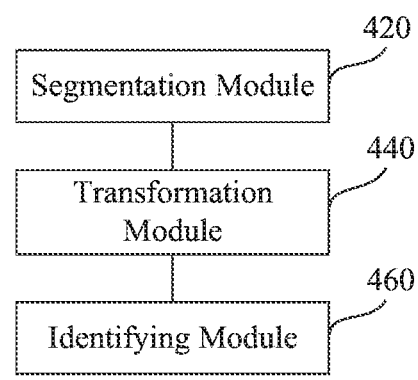
FIG. 4 is a block diagram of a device for identifying a feature of an image, according to an exemplary embodiment.

FIG. 4 is a block diagram of a device 400 for identifying a feature of an image, according to an exemplary embodiment. The device 400 may be implemented as a part or all of a terminal device. Referring to FIG. 4, the device 400 includes a segmentation module 420, a transformation module 440, and an identifying module 460.

The segmentation module 420 is configured to segment an image into a plurality of blocks, where each block includes a plurality of cells. For example, the segmentation module 420 segments the image into a plurality of blocks, and then segment each block into a plurality of cells. As another example, the segmentation module 420 segments the image into a plurality of cells, and then composes a block by joining the neighboring cells, where each block includes a plurality of cells.

The transformation module 440 is configured to transform pixels of each cell from a spatial domain to a frequency domain such that the image is transformed from the spatial domain to the frequency domain. For example, the transformation module 440 is configured to perform a DCT operation on pixels of each cell such that the image is transformed from a spatial domain to a frequency domain. As another example, the transformation module 440 is configured to perform a DFT operation on pixels of each cell such that the image is transformed from the spatial domain to the frequency domain.

The identifying module 460 is configured to identify a HOG feature of the image in the frequency domain.

Figure 5:
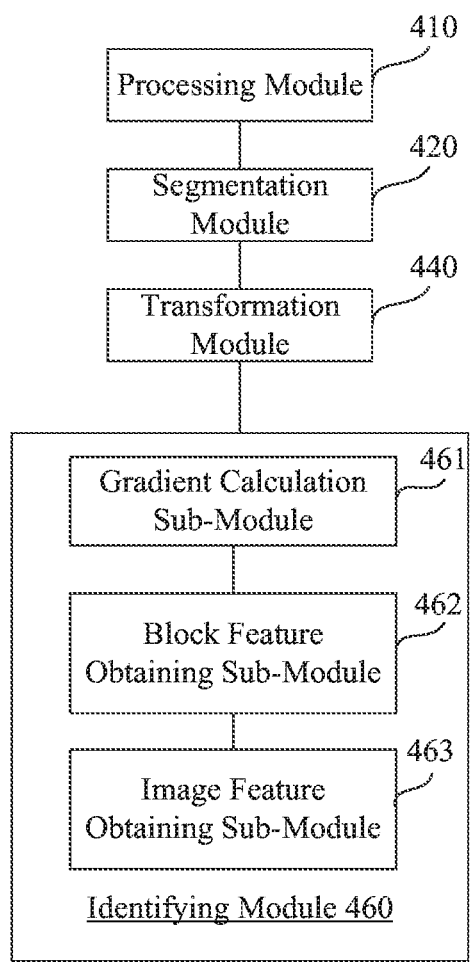
FIG. 5 is a block diagram of a device for identifying a feature of an image, according to another exemplary embodiment.

FIG. 5 is a block diagram of a device 500 for identifying a feature of an image, according to another exemplary embodiment. The device 500 may be implemented as a part or all of a terminal device. Referring to FIG. 5, in addition to the segmentation module 420, transformation module 440, and identifying module 460 (FIG. 4), the device 500 further includes a processing module 410.

The processing module 410 is configured to normalize the image to obtain an image having a predefined magnitude.

For example, the processing module 410 is configured to normalize images having different magnitudes to images having a predefined magnitude before identifying features from the images.

Referring to FIG. 5, the identifying module 460 includes a gradient calculation sub-module 461, a block feature obtaining sub-module 462, and an image feature obtaining sub-module 463.

The gradient calculation sub-module 461 is configured to calculate a gradient magnitude and a gradient direction of each cell in the frequency domain to obtain a descriptor of each cell.

For example, the gradient calculation sub-module 461 calculates a transverse gradient and a longitudinal gradient of each pixel in each cell, on which the DCT or DFT is performed, by using a gradient operator.

The block feature obtaining sub-module 462 is configured to obtain a HOG feature of each block based on descriptors of each block in the frequency domain.

For example, the block feature obtaining sub-module 462 cascades the descriptors corresponding to respective cells so that the HOG feature of each block is a vector.

The image feature obtaining sub-module 463 is configured to obtain the HOG feature of the image based on the HOG feature of each block in the frequency domain.

For example, the image feature obtaining sub-module 463 is configured to cascade the HOG features of respective blocks in the image to form a matrix as the HOG feature of the image, where each column of the matrix represents the HOG feature of one of the blocks.

Figure 6:
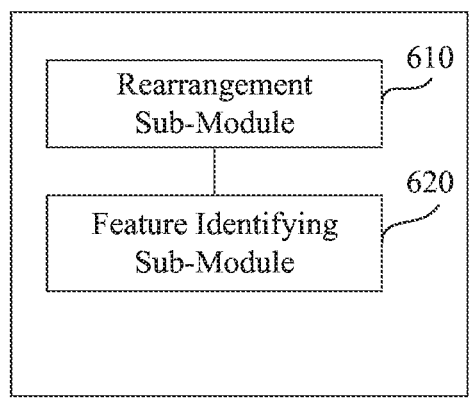
FIG. 6 is a block diagram of an image feature obtaining sub-module of a device, according to an exemplary embodiment.

FIG. 6 is a block diagram of the image feature obtaining sub-module 463, according to an exemplary embodiment. Referring to FIG. 6, the image feature obtaining sub-module 463 includes a rearrangement sub-module 610 and a feature identifying sub-module 620.

The rearrangement sub-module 610 is configured to rearrange the HOG feature of each block in the image from an initial L×1 vector to an M×N matrix, where each block includes M×N pixels, and L=M×N.

For example, the rearrangement sub-module 610 rearranges the L×1 vector of each block to a corresponding matrix based on the included cells, where each column of the corresponding matrix represents the descriptor of one cell. The descriptors of each of the cells is adjusted based on the corresponding pixels such that each column of the matrix represents the HOG feature corresponding to the pixels of the corresponding column in the block.

The feature identifying sub-module 620 is configured to obtain the HOG feature of the image based on the rearranged HOG feature of each block and the position of each block in the image.

Figure 7:
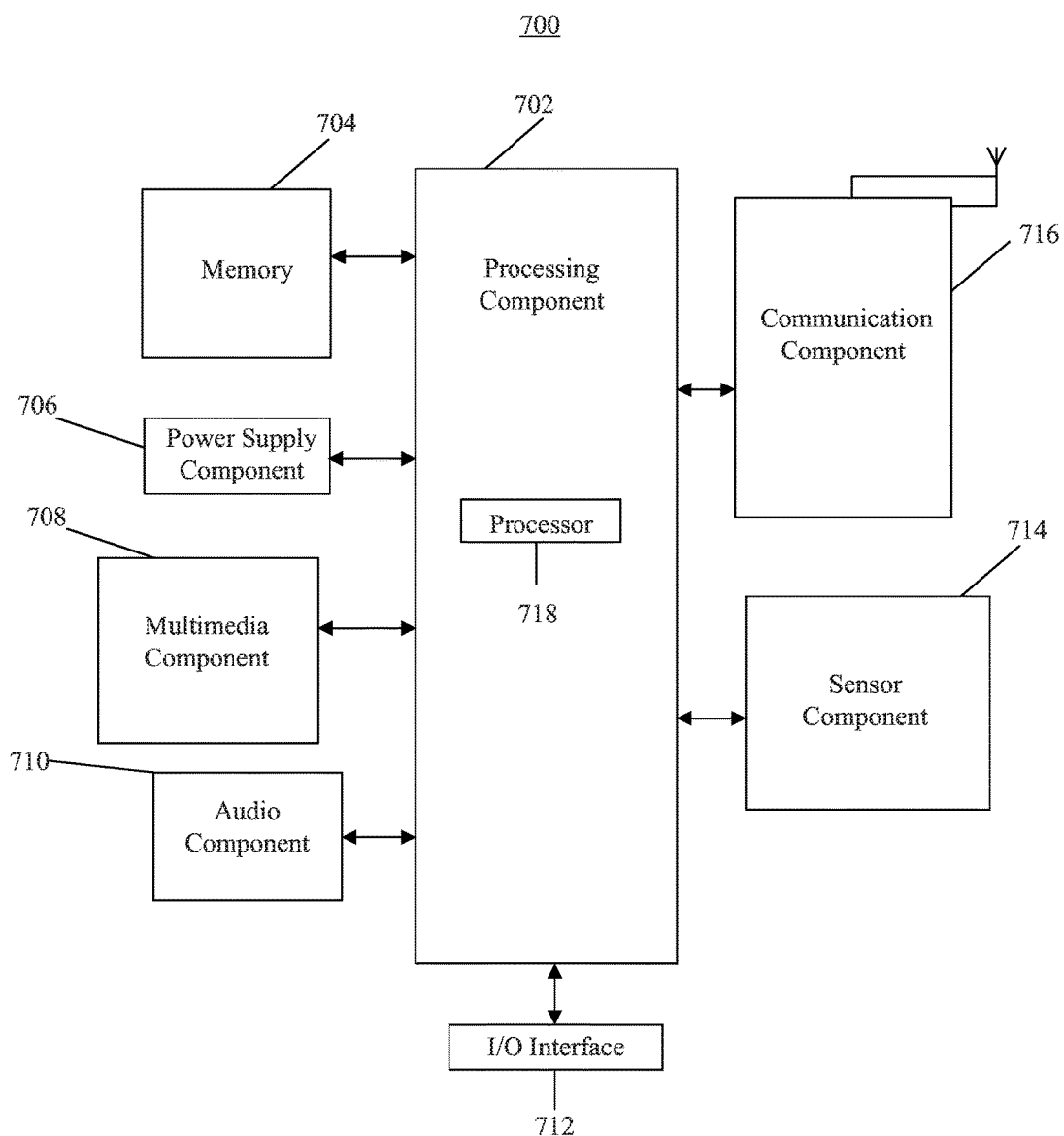
FIG. 7 is a block diagram of a device for identifying a feature of an image, according to another exemplary embodiment.

FIG. 7 is a block diagram of a terminal device 700 for identifying a feature of an image, according to an exemplary embodiment. For example, the terminal device 700 may be a mobile phone, a computer, a digital broadcast terminal, a messaging device, a gaming console, a tablet device, a medical device, exercise equipment, a personal digital assistant, and the like.

Referring to FIG. 7, the terminal device 700 may include one or more of the following components: a processing component 702, a memory 704, a power supply component 706, a multimedia component 708, an audio component 710, an input/output (I/O) interface 712, a sensor component 714 and a communication component 716. The person skilled in the art should appreciate that the structure of the terminal device 700 as shown in FIG. 7 is not intended to limit the terminal device 700. The terminal device 700 may include more or less components or combine some components or other different components.

The processing component 702 typically controls overall operations of the terminal device 700, such as the operations associated with display, telephone calls, data communications, camera operations, and recording operations. The processing component 702 may include one or more processors 718 to execute instructions to perform all or part of the steps in the above described methods. Moreover, the processing component 702 may include one or more modules which facilitate the interaction between the processing component 702 and other components. For instance, the processing component 702 may include a multimedia module to facilitate the interaction between the multimedia component 708 and the processing component 702.

The memory 704 is configured to store various types of data to support the operation of the terminal device 700. Examples of such data include instructions for any applications or methods operated on the terminal device 700, contact data, phonebook data, messages, images, video, etc. The memory 704 is also configured to store programs and modules. The processing component 702 performs various functions and data processing by operating programs and modules stored in the memory 704. The memory 704 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power supply component 706 is configured to provide power to various components of the terminal device 700. The power supply component 706 may include a power management system, one or more power sources, and any other components associated with the generation, management, and distribution of power for the terminal device 700.

The multimedia component 708 includes a screen providing an output interface between the terminal device 700 and a user. In some embodiments, the screen may include a liquid crystal display (LCD) and/or a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 708 includes a front camera and/or a rear camera. The front camera and the rear camera may receive an external multimedia datum while the terminal device 700 is in an operation mode, such as a photographing mode or a video mode. Each of the front camera and the rear camera may be a fixed optical lens system or have optical focusing and zooming capability.

The audio component 710 is configured to output and/or input audio signals. For example, the audio component 710 includes a microphone configured to receive an external audio signal when the terminal device 700 is in an operation mode, such as a call mode, a recording mode, and a voice recognition mode. The received audio signal may be further stored in the memory 704 or transmitted via the communication component 716. In some embodiments, the audio component 710 further includes a speaker to output audio signals.

The I/O interface 712 provides an interface between the processing component 702 and peripheral interface modules, the peripheral interface modules being, for example, a keyboard, a click wheel, buttons, and the like. The buttons may include, but are not limited to, a home button, a volume button, a starting button, and a locking button.

The sensor component 714 includes one or more sensors to provide status assessments of various aspects of the terminal device 700. For instance, the sensor component 714 may detect an on/off state of the terminal device 700, relative positioning of components (e.g., the display and the keypad, of the terminal device 700), a change in position of the terminal device 700 or a component of the terminal device 700, a presence or absence of user contact with the terminal device 700, an orientation or an acceleration/deceleration of the terminal device 700, and a change in temperature of the terminal device 700. The sensor component 714 may include a proximity sensor configured to detect the presence of a nearby object without any physical contact. The sensor component 714 may also include a light sensor, such as a CMOS or CCD image sensor, for use in imaging applications. In some embodiments, the sensor component 714 may also include an accelerometer sensor, a gyroscope sensor, a magnetic sensor, a pressure sensor, or a temperature sensor.

The communication component 716 is configured to facilitate communication, wired or wirelessly, between the terminal device 700 and other devices. The terminal device 700 can access a wireless network based on a communication standard, such as WiFi, 2G, 3G, or 4G, or a combination thereof. In an exemplary embodiment, the communication component 716 receives a broadcast signal or broadcast information from an external broadcast management system via a broadcast channel In an exemplary embodiment, the communication component 716 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the terminal device 700 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 704, executable by the processor 718 in the terminal device 700, for performing the above-described methods. For example, the non-transitory computer-readable storage medium may be a ROM, a RAM, a CD-ROM, a magnetic tape, a floppy disc, an optical data storage device, and the like.

It should be understood by those skilled in the art that the above described modules can each be implemented through hardware, or software, or a combination of hardware and software. One of ordinary skill in the art will also understand that multiple ones of the above described modules may be combined as one module, and each of the above described modules may be further divided into a plurality of sub-modules.

Other embodiments of the invention will be apparent to those skilled in the art from consideration of the specification and practice of the disclosures herein. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the invention being indicated by the following claims.

It will be appreciated that the inventive concept is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for identifying a feature of an image, comprising:
   segmenting an image into a plurality of blocks, wherein each block includes a plurality of cells;
   transforming pixels of each cell from a spatial domain to a frequency domain; and
   identifying a Histogram of Oriented Gradient (HOG) feature of the image in the frequency domain,
   wherein said identifying the HOG feature of the image in the frequency domain comprises:
     calculating a gradient magnitude and a gradient direction of each cell in the frequency domain to obtain a descriptor of each cell;
     obtaining a HOG feature of each block based on a descriptor of each block in the frequency domain; and
     obtaining the HOG feature of the image based on the HOG feature of each block in the frequency domain,
   wherein said obtaining the HOG feature of the image comprises:
     cascading the HOG feature of each block into a matrix, wherein each column of the matrix represents the HOG feature of one of the plurality of blocks.

2. The method of claim 1, wherein said transforming each cell from the spatial domain to the frequency domain comprises:
   performing a Discrete Cosine Transform (DCT) operation on pixels of each cell.

3. The method of claim 1, wherein said transforming each cell from the spatial domain to the frequency domain comprises:
   performing a Discrete Fourier Transform (DFT) operation on pixels of each cell.

4. The method of claim 1, wherein said obtaining the HOG feature of the image comprises:
   rearranging the HOG feature of each block from an L×1 vector to an M×N matrix, wherein each block comprises M×N pixels, and L=M×N; and
   obtaining the HOG feature of the image based on the rearranged HOG feature of each block and a position of the corresponding block in the image.

5. The method of claim 1, wherein the gradient direction of each cell is divided into z portions, z is an integer, and the descriptor of each cell is a z-dimensional vector obtained based on gradient magnitude of pixels in each of the z portions.

6. The method of claim 1, further comprising:
   normalizing the image to obtain an image having a predefined magnitude.

7. The method of claim 1, wherein each block overlaps with at least another block.

8. A device for identifying a feature of an image, comprising:
   a processor; and
   a memory for storing instructions executable by the processor;
   wherein the processor is configured to:
     segment an image into a plurality of blocks, wherein each block includes a plurality of cells;

transform pixels of each cell from a spatial domain to a frequency domain; and identify a Histogram of Oriented Gradient (HOG) feature of the image in the frequency domain;

wherein in identifying the HOG feature of the image in the frequency domain, the processor is further configured to:

calculate a gradient magnitude and a gradient direction of each cell in the frequency domain to obtain a descriptor of each cell;

obtain a HOG feature of each block based on a descriptor of each block in the frequency domain; and obtain the HOG feature of the image based on the HOG feature of each block in the frequency domain;

wherein in obtaining the HOG feature of the image, the processor is further configured to:

cascade the HOG feature of each block into a matrix, wherein each column of the matrix represents the HOG feature of one of the plurality of blocks.

9. The device of claim 8, wherein the processor is further configured to perform a Discrete Cosine Transform (DCT) operation on pixels of each cell.

10. The device of claim 8, wherein the processor is further configured to perform a Discrete Fourier Transform (DFT) operation on pixels of each cell.

11. The device of claim 8, wherein the processor is further configured to:

rearrange the HOG feature of each block from an L×1 dimensional vector to an M×N matrix, wherein each block comprises M×N pixels, and L=M×N; and obtain the HOG feature of the image based on the rearranged HOG feature of each block and a position of the corresponding block in the image.

12. The device of claim 8, wherein the processor is further configured to:

divide the gradient direction of each cell into z portions, z being an integer; and obtain the descriptor of each cell based on gradient magnitude of pixels in each of the z portions, the descriptor of each cell being a z-dimensional vector.

13. The device of claim 8, the processor is further configured to:

normalize the image to obtain an image having a predefined magnitude.

14. The device of claim 8, wherein each block overlaps with at least another block.

15. A non-transitory computer-readable storage medium having stored therein instructions that, when executed by a processor, cause the processor to perform a method for identifying a feature of an image, the method comprising:

segmenting an image into a plurality of blocks, wherein each block includes a plurality of cells;

transforming pixels of each cell from a spatial domain to a frequency domain; and identifying a Histogram of Oriented Gradient (HOG) feature of the image in the frequency domain, wherein said identifying the HOG feature of the image in the frequency domain comprises:

calculating a gradient magnitude and a gradient direction of each cell in the frequency domain to obtain a descriptor of each cell;

obtaining a HOG feature of each block based on a descriptor of each block in the frequency domain; and obtaining the HOG feature of the image based on the HOG feature of each block in the frequency domain, wherein said obtaining the HOG feature of the image comprises:

cascading the HOG feature of each block into a matrix, wherein each column of the matrix represents the HOG feature of one of the plurality of blocks.

* * * * *